United States Patent
Koeppel et al.

(10) Patent No.: US 10,769,616 B2
(45) Date of Patent: Sep. 8, 2020

(54) METHODS AND SYSTEMS FOR DISPLAYING ACCOUNT INFORMATION

(71) Applicant: Capital One Services, LLC, McLean, VA (US)

(72) Inventors: Adam R. Koeppel, Washington, DC (US); Alex Leo Niderberg, Arlington, VA (US); Kevin Kelly, Austin, TX (US); Mili Mittal, Washington, DC (US); Sarah Calandro, San Francisco, CA (US); Jonathan R. Turfboer, San Francisco, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/592,291

(22) Filed: Oct. 3, 2019

(65) Prior Publication Data
US 2020/0034817 A1    Jan. 30, 2020

Related U.S. Application Data

(63) Continuation of application No. 16/159,504, filed on Oct. 12, 2018, now Pat. No. 10,475,022, which is a
(Continued)

(51) Int. Cl.
*G06Q 20/34*   (2012.01)
*G06Q 20/32*   (2012.01)
(Continued)

(52) U.S. Cl.
CPC ....... *G06Q 20/327* (2013.01); *G06Q 20/3221* (2013.01); *G06Q 20/34* (2013.01);
(Continued)

(58) Field of Classification Search
CPC .... G06Q 20/341; G06Q 20/34; G06Q 20/347; G06Q 20/351; G06Q 20/36; G06Q 20/363; G06Q 20/367
See application file for complete search history.

(56) References Cited

U.S. PATENT DOCUMENTS 8,600,863 B2 *  12/2013  Jain ...................... G07F 7/0846
                                                            705/37
8,820,638 B1 *   9/2014  Cotter ................... G06Q 40/02
                                                            235/380

(Continued)

*Primary Examiner* — Benyam Haile
(74) *Attorney, Agent, or Firm* — Finnegan, Henderson, Farabow, Garrett & Dunner, LLP

(57) ABSTRACT

Systems and methods are provided for displaying account information. The systems and methods may include a portable smart display device in short-range communication with a mobile device. The smart display device may be configured to provide a user with quick and easy yet secure access to account information, without the need for multi-step login and verification processes. The smart display device may be sized to fit within a wallet and within quick, easy reach of a user. The smart display device may receive up-to-date account information from the mobile device, and display the account information on-demand upon detecting an activation event, thereby providing an enjoyable user experience and a useful tool for quickly informing the user of their financial situation.

18 Claims, 9 Drawing Sheets

Related U.S. Application Data continuation of application No. 15/974,253, filed on May 8, 2018, now Pat. No. 10,127,545, which is a continuation of application No. 15/712,056, filed on Sep. 21, 2017, now Pat. No. 10,007,905, which is a continuation of application No. 14/836,297, filed on Aug. 26, 2015, now Pat. No. 9,811,821.

(60) Provisional application No. 62/041,864, filed on Aug. 26, 2014.

(51) Int. Cl.
*H04W 64/00* (2009.01)
*G06Q 20/36* (2012.01)
*G06Q 40/02* (2012.01)
*G06K 19/077* (2006.01)
*H04W 76/00* (2018.01)
*H04W 4/80* (2018.01)

(52) U.S. Cl.
CPC ........... *G06Q 20/341* (2013.01); *G06Q 20/36* (2013.01); *G06Q 40/02* (2013.01); *H04W 64/003* (2013.01); *G06K 19/07749* (2013.01); *H04W 4/80* (2018.02); *H04W 64/00* (2013.01); *H04W 76/00* (2013.01)

(56) References Cited

U.S. PATENT DOCUMENTS

| | | |
|---|---|---|
| 9,497,586 B2 | 11/2016 | Brown et al. |
| 2004/0238625 A1 | 12/2004 | Walker et al. |
| 2012/0120816 A1 | 5/2012 | Garg |
| 2013/0281110 A1 | 10/2013 | Zelinka |
| 2014/0177494 A1* | 6/2014 | Min ............... H04Q 9/00 370/311 |
| 2016/0148194 A1* | 5/2016 | Guillaud ............ G07F 7/0846 705/44 |

* cited by examiner

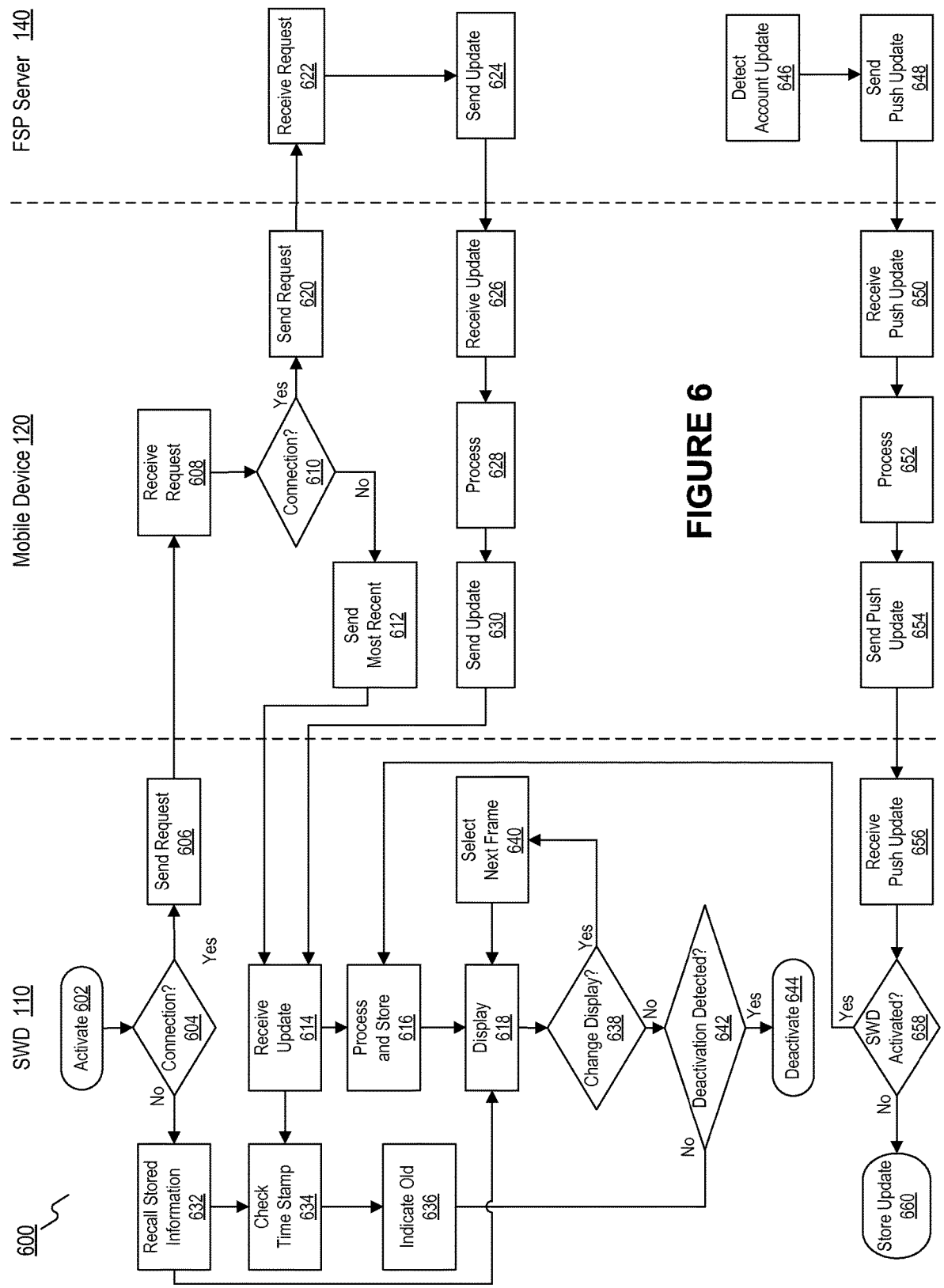

METHODS AND SYSTEMS FOR DISPLAYING ACCOUNT INFORMATION

CROSS REFERENCE TO RELATED APPLICATIONS

This application is a continuation of application Ser. No. 16/159,504, filed Oct. 12, 2018, which is a continuation of application Ser. No. 15/974,253, filed May 8, 2018, which issued as U.S. Pat. No. 10,127,545 on Nov. 13, 2018, which is a continuation of application Ser. No. 15/712,056, filed Sep. 21, 2017, which issued as U.S. Pat. No. 10,007,905 on Jun. 26, 2018, which is a continuation of application Ser. No. 14/836,297, filed Aug. 26, 2015, which issued as U.S. Pat. No. 9,811,821 on Nov. 7, 2017, which claims the benefit of priority from U.S. Provisional Application No. 62/041,864, filed Aug. 26, 2014. The contents of each application is expressly incorporated herein by reference.

BACKGROUND

In today's society, credit cards and debit cards are used for making payments far more frequently than cash. Card payments can be faster and easier than cash payments, for both the purchaser and the vendor. But the convenience of card payments can deceive cardholders who are not fully aware of their current financial situation. Most cardholders typically have, at best, only a high level understanding of their account balances when making new purchases. As a result, cardholders may not have the cash necessary to pay the card balances after accruing multiple blind purchases. Thus, many people find themselves incurring significant debt through blind usage of their credit cards, or by incurring overdraft charges or otherwise depleting their debit card balances too quickly.

Those who monitor their financial situations periodically check balances or request alerts from their financial service provider when debt thresholds are surpassed. Due to the rise of smart phones and Internet-connected devices, individuals can also check account balances on-the-go. But current systems typically require people to login to their smart phone, navigate to a website or application, login in to the website/application, and then navigate through one or more web pages to their balance information. Even after performing this cumbersome process, many systems and applications still require the user to perform mental calculations to estimate account information. These systems are impractical to use while checking out in a point-of-sale transaction, such as in line at a store. Consequentially, many people forego checking their accounts and remain unaware of their current financial status while spending money.

In view of the shortcomings of current systems, a convenient and reliable way to retrieve and display financial account information is desired.

SUMMARY

Disclosed embodiments provide methods and systems for using a smart wallet display device to retrieve and display financial account information.

Consistent with a disclosed embodiment, a system for displaying account information is provided. The system may include a display device comprising a processor, a display, a transceiver, and a memory having stored thereon instructions that, when executed by the processor, cause the processor to perform one or more operations. The operations may include pairing with a mobile device configured to access account information associated with a user, receiving the account information via short-range wireless transmission from the mobile device, detecting an activation event, and displaying the account information based on the activation event.

Consistent with another disclosed embodiment, a computer-implemented method for displaying account information is provided. The method may comprise pairing with a mobile device configured to access account information associated with a user, receiving account information via short-range wireless transmission from the mobile device, detecting an activation event, and displaying the account information based on the activation event.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 6 is a diagram of an exemplary smart wallet display update and display process, consistent with disclosed embodiments.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments are directed to systems and methods for providing account information on a smart wallet display ("SWD"). According to some embodiments, the SWD may receive account information wirelessly from a mobile device running a computer-executable software application ("app") provided by a financial service provider ("FSP"). The FSP may be a bank, credit card company, or other entity associated with financial transactions. The mobile application may be a standalone software application for a personal computing device, such as personal computer software or a mobile device app, or part of another software application provided by the FSP for managing finances related to banking, checking credit cards, debit cards, and/or loans.

In some embodiments, the SWD may be a small, credit card-sized device having indicators or a display such as a digital display screen. The SWD may communicatively link to a mobile device such as a smart phone using near-field communication or short range wireless transmission such as Bluetooth Low Energy ("Bluetooth™ LE") to receive account information. In some embodiments, the mobile device may have one or more applications installed from the FSP, for requesting and receiving account information from the FSP system, and for sending account information to the SWD. The SWD may receive account information updates initiated by the financial service provider computer system as "push" updates when the account incurs new charges or activity. For example, when there is a change to the user's financial status, like a transaction or a deposit, the user's mobile device may receive a data push, which it may then relay to the SWD.

In some situations, the SWD may also request account information updates automatically upon activation or manually based user interaction with the SWD and/or mobile device. For example, when the user opens up her or his wallet having the SWD inside, the SWD may activate, request updated account information, and display the received account information to indicate the user's financial status.

Some embodiments of the SWD may have one or more buttons to receive user input. For example, the customer can manipulate one or more buttons to advance through several screens on the SWD showing additional financial data like payment due dates, credit score, budgeting information, or other financial information. The SWD can display current up-to-date account information in an easy-to-read format as soon as the user opens the wallet or removes a card, thereby informing the user of their financial situation quickly and conveniently.

Figure 1:
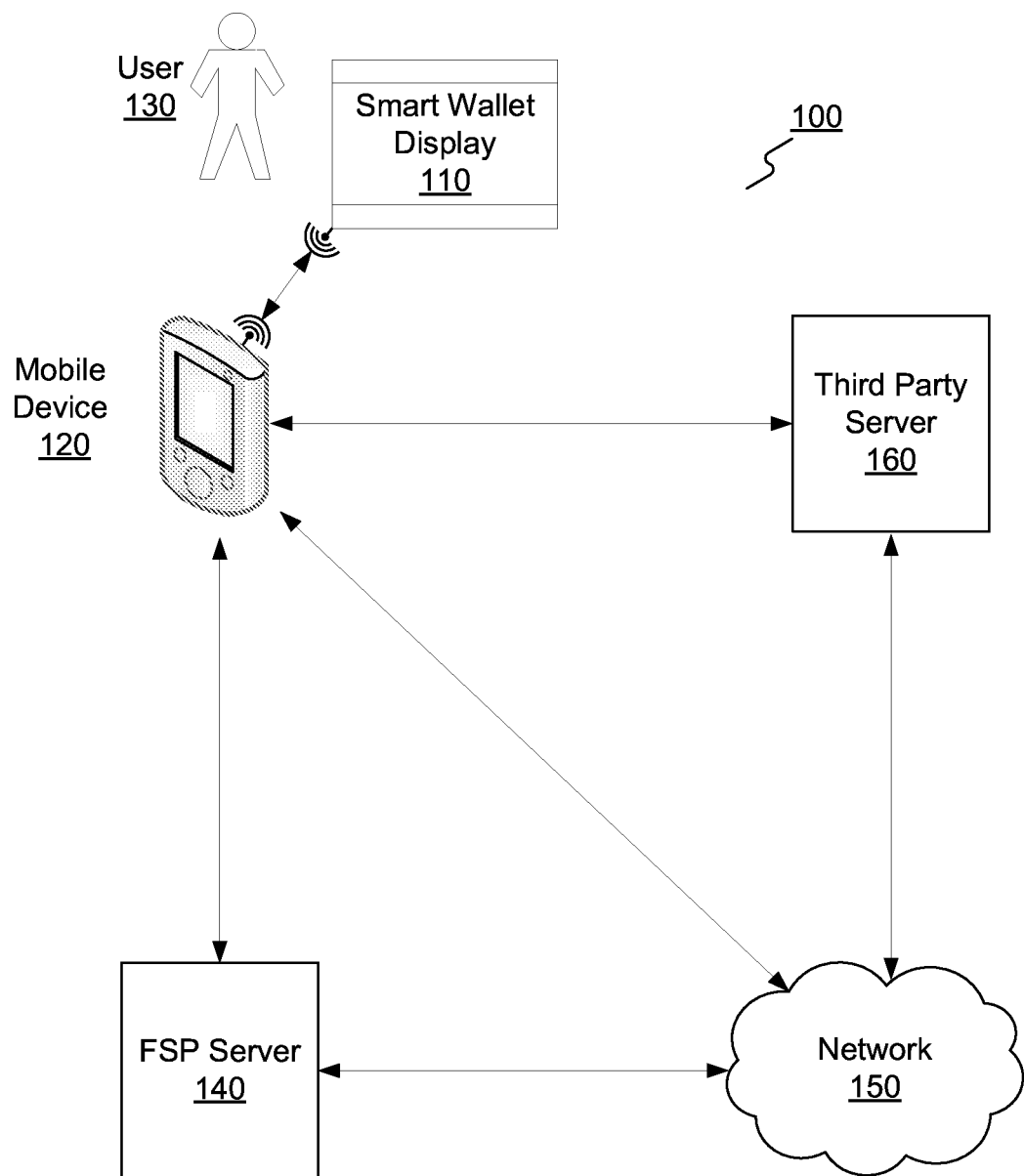
FIG. 1 is a diagram of an exemplary system that may be used to retrieve and display account information using a smart wallet display, consistent with disclosed embodiments.

FIG. 1 shows a diagram of an exemplary account information display system 100 that may be configured to perform one or more software processes that, when executed by one or more processors, retrieve and display financial account information, consistent with disclosed embodiments. The components and arrangements shown in FIG. 1 are not intended to limit the disclosed embodiments, as the components used to implement the disclosed processes and features may vary.

In accordance with disclosed embodiments, account information display system 100 may include a smart wallet display ("SWD") 110, one or more mobile device 120, a financial service provider ("FSP") server 140, and one or more third party servers 160. Mobile device 120, FSP server 140, and third party server 160 may communicate through network 150.

User 130 may be a customer of the financial service provider, such as an individual who holds a credit card, debit card, checking, and/or savings account with a financial service provider bank. User 130 may operate SWD 110 and/or mobile device 120 to set up SWD 110, and to retrieve and display account information on SWD 110.

Mobile device 120 may be connected to FSP server 140 and/or third party server 160 directly or via network 150. Other components known to one of ordinary skill in the art may be included in system 100 to gather, process, transmit, receive, and provide account information consistent with the disclosed embodiments.

Mobile device 120 may be a personal computing device such as, for example, a general purpose or notebook computer, a mobile device with computing ability, a tablet, smartphone, wearable device such as Google Glass™ or smart watches, or any combination of these computers and/or affiliated components. In one embodiment, mobile device 120 may be a computer system or mobile computer device that is operated by customer 130 who is a customer of the FSP.

FSP server 140 may be operated by a FSP such as a bank, credit card company, merchant, lender, and the like, offering financial services to customers. FSP server 140 may be a computer-based system including computer system components, desktop computers, workstations, tablets, hand held computing devices, memory devices, and/or internal network(s) connecting the components.

Network 150 may comprise any type of computer networking arrangement used to exchange data. For example, network 150 may be the Internet, a private data network, virtual private network using a public network, and/or other suitable connection(s) that enables system 100 to send and receive information between the components of system 100. Network 150 may also include a public switched telephone network ("PSTN") and/or a wireless network.

Third party server 160 may be operated by a data reporting agency, such as a credit reporting agency, or by another financial institution other than the FSP that operates FSP server 140. Mobile device 120 and/or FSP server 140 may receive information about user 130's financial situation from third party server 160 such as, for example, a credit report, a credit score, or information about another account belonging to user 130. Third party server 160 may include a computer system for handling tasks and data processing related to the operation of the third party (not shown in figure).

Figure 2:
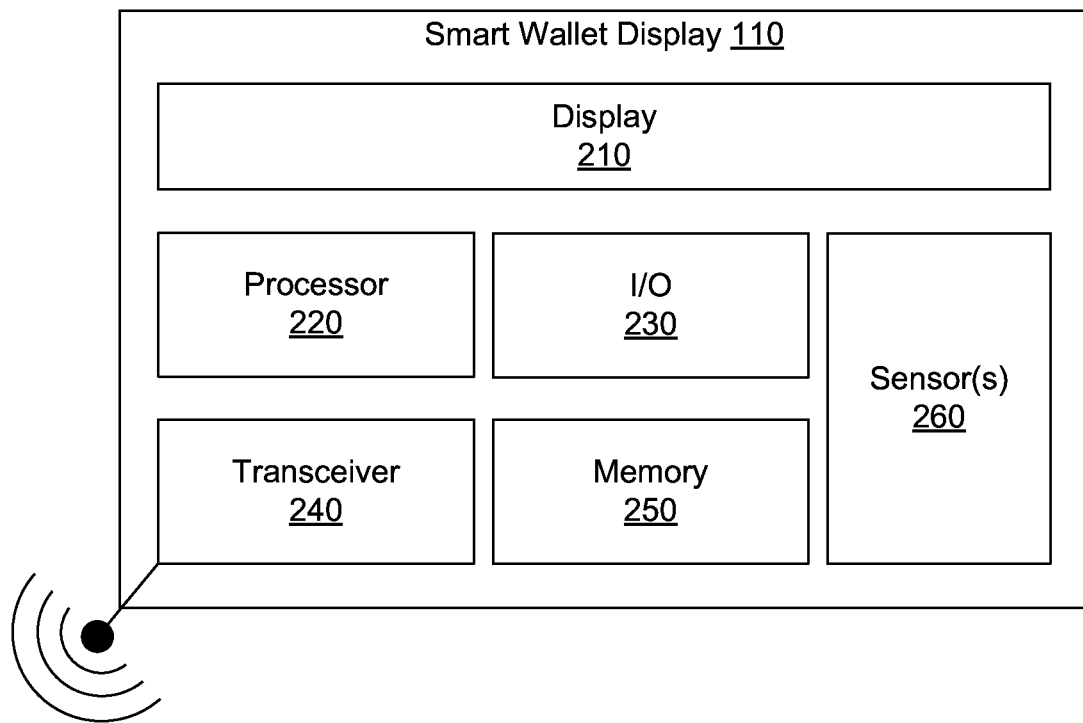
FIG. 2 is a diagram of an exemplary smart wallet display, consistent with disclosed embodiments.

FIG. 2 shows a diagram of SWD 110, consistent with disclosed embodiments. As shown, SWD 110 may include a display 210, one or more processors 220, input/output ("I/O") devices 230, a transceiver 240, memory 250, one or more sensors 260, and/or a battery with charging circuitry (not shown in figure).

Display 210 may include one or more devices for displaying account information such as, for example, one or more indicator lights, progress bars, numeric light emitting diodes (LEDs), and/or one or more screens such as a liquid crystal display (LCD). In some embodiments, SWD 110 display 210 may comprise a simple indicator light or set of lights, indicating whether a predetermined threshold for debt or spending amount is surpassed. In other embodiments, display 210 may comprise a strip of indicator lights forming a progress/status bar to display progress toward a spending goal or debt limit. The indicator light strip may contain lights of various colors, or the entire strip may change colors, indicative of an account status or a threshold being crossed. In some embodiments, display 210 may comprise an LCD (or other type of pixelated screen) to display one or more lines of text, numbers, and symbols to provide account information.

Processor 220 may be one or more known processing devices, such as a microprocessor from the Pentium™ family manufactured by Intel™ or the Turion™ family manufactured by AMD™. Processor 220 may constitute a single core or multiple core processors that executes parallel processes simultaneously. For example, processor 220 may be a single core processor configured with virtual processing technologies. In certain embodiments, processor 220 may use logical processors to simultaneously execute and control multiple processes. Processor 220 may implement virtual machine technologies, or other known technologies to provide the ability to execute, control, run, manipulate, store, etc. multiple software processes, applications, programs, etc.

In another embodiment, processor 220 may include a multiple-core processor arrangement (e.g., dual, quad core, etc.) configured to provide parallel processing functionalities to allow FSP server 140 to execute multiple processes simultaneously. One of ordinary skill in the art would understand that other types of processor arrangements could be implemented that provide for the capabilities disclosed herein.

I/O devices 230 may include one or more devices that allow SWD 110 to receive input from user 130. I/O devices 230 may include, for example, one or more buttons, switches, or a touchscreen panel. I/O devices 230 may be manipulated by user 130 to activate/deactivate SWD 110, or to toggle between different frames of account information shown on display 210.

Transceiver 240 may include one or more communication modules for establishing bidirectional wireless communication between SWD 110 and mobile device 120. For example, transceiver 240 may include circuitry and one or more antennas for communicating wirelessly with mobile device 120 using a short range/near-field wireless communication protocol such as Bluetooth™, Bluetooth™ LE, WiFi, Zigbee, and Z-Wave. Transceiver 240 may be configured to send requests and receive account information and settings when SWD 110 is active. Furthermore, transceiver 240 may be configured to continue receiving account information and control signals while SWD 110 is in a "sleep" or "deactivated" state. In some embodiments, transceiver 240 may establish communication with FSP server 140 and/or third party server 160, either via a direct communication link or via network 150, to send requests and receive account information directly without the need for mobile device 120. In such embodiments, transceiver 240 may communicate using a protocol linked directly to the Internet such as WiFi, or transceiver 240 may contain long rang communication capabilities such as a cellular antenna.

Memory 250 may be a volatile or non-volatile, magnetic, semiconductor, tape, optical, removable, non-removable, or other type of storage device or tangible (i.e., non-transitory) computer-readable medium that stores account information, settings, and one or more programs for performing functions consistent with the methods disclosed herein. For example, memory 250 may store one or more programs that, when executed, perform functions such as monitoring activation and deactivation commands, monitoring sensor data from sensors 260, sending account information requests, receiving account information updates (including push updates), processing account information updates based on predetermined settings, storing account information, displaying account information, and/or generating multiple frames of account information data.

In some embodiments, SWD 110 may contain one or more sensors 260 for collecting environmental, movement, and/or security data. Sensors 260 may include, for example, ambient light sensors, accelerometers, microphones, and/or biometric sensors such as fingerprint readers. Processor 220 may use data collected by sensors 260 to control or modify SWD 110 functions. For example, in some embodiments biometric data such as fingerprint scans may be used to authenticate user 130 upon activating SWD 110. In some embodiments, ambient light, movement, and/or sound data may be monitored to activate and/or deactivate SWD 110. By using sensors 260 to automate certain functions of SWD 110 and to add security layers that are simple to unlock, such as fingerprint scans, SWD 110 may provide a more enjoyable user experience by securing user 130 account information while providing quick and easy access to the account information upon removing SWD 110 from user 130's pocket or purse, without the need for cumbersome multistep activation, login, and verification processes.

Figure 3:
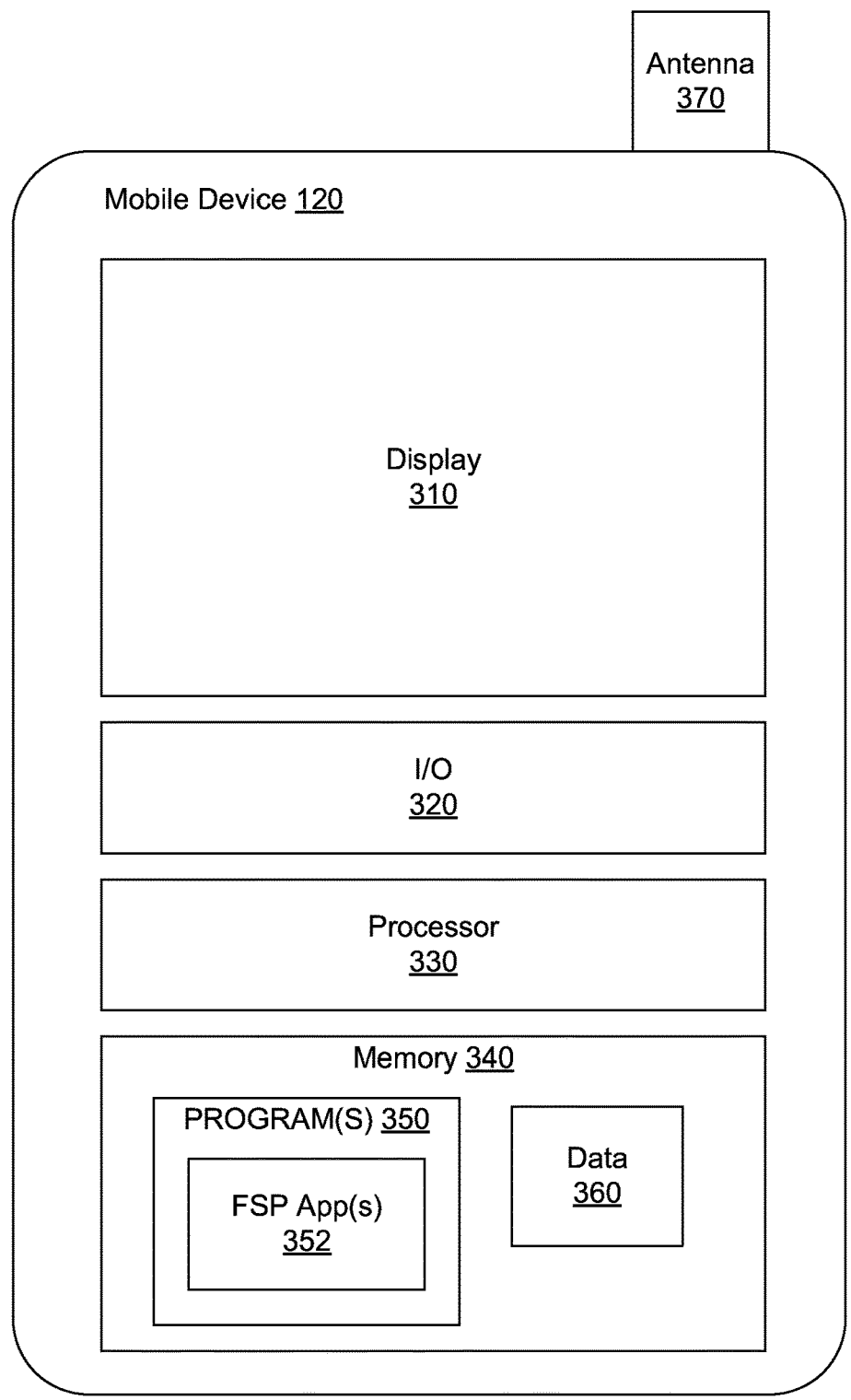
FIG. 3 is a diagram of an exemplary mobile device, consistent with disclosed embodiments.

FIG. 3 shows a diagram of an exemplary mobile device 120, consistent with disclosed embodiments. As shown, mobile device 120 may include display 310, I/O devices 320, processor 330, memory 340 having stored thereon one or more programs 350 such as FSP app 352, and also storing data 360, and further including antenna 370.

Display 310 may include one or more devices for displaying information, including but not limited to, liquid crystal displays (LCD), light emitting diode screens (LED), organic light emitting diode screens (OLED), and other known display devices.

I/O devices 320 may include one or more devices that allow mobile device 120 to send and receive information. I/O devices 320 may include, for example, a keyboard, buttons, switches, or a touchscreen panel. I/O devices 320 may also include one or more communication modules (not shown) for sending and receiving information via antenna 370 from other components in system 100 by, for example, establishing wired or wireless connectivity between mobile device 120 to network 150, by establishing direct wired or wireless connections between mobile device 120 and FSP server 140, or between mobile device 120 and third party server 160. Direct connections may include, for example, Bluetooth™, Bluetooth LE™, WiFi, near field communications (NFC), or other known communication methods which provide a medium for transmitting data between separate devices.

Processor(s) 330 may be one or more known computing devices, such as those described with respect to processor 220 in FIG. 2.

Memory 340 may be a volatile or non-volatile, magnetic, semiconductor, tape, optical, removable, non-removable, or other type of storage device or tangible (i.e., non-transitory) computer-readable medium that stores one or more program(s) 350 such as FSP app 352, and data 360. Data 360 may include, for example, user 130's personal information, account information, and display settings and preferences.

Program(s) 350 may include operating systems (not shown) that perform known operating system functions when executed by one or more processors. By way of example, the operating systems may include Microsoft Windows™, Unix™, Linux™ Apple™ operating systems, Personal Digital Assistant (PDA) type operating systems, such as Microsoft CE™, or other types of operating systems. Accordingly, disclosed embodiments may operate and function with computer systems running any type of operating system. Mobile device 120 may also include communication software that, when executed by a processor, provides communications with network 150, such as Web browser software, tablet, or smart hand held device networking software, etc. Mobile device 120 may be a device that executes mobile applications for performing operations consistent with disclosed embodiments, such as a tablet or mobile device.

Program(s) 350 may also include FSP app(s) 352, such as an account information app, which when executed causes mobile device 120 to perform processes related to providing account information such as: activating and setting up a new SWD 110, receiving push updates from FSP server 140, receiving account information requests from SWD 110, sending account information requests to FSP server 140, receiving account information updates from FSP server 140, processing received account information, and sending account information updates (including push updates) to SWD 110. In some embodiments, mobile device 120 receive encrypted account information from FSP server 140, and decrypt the account information before sending to SWD 110.

Figure 4:
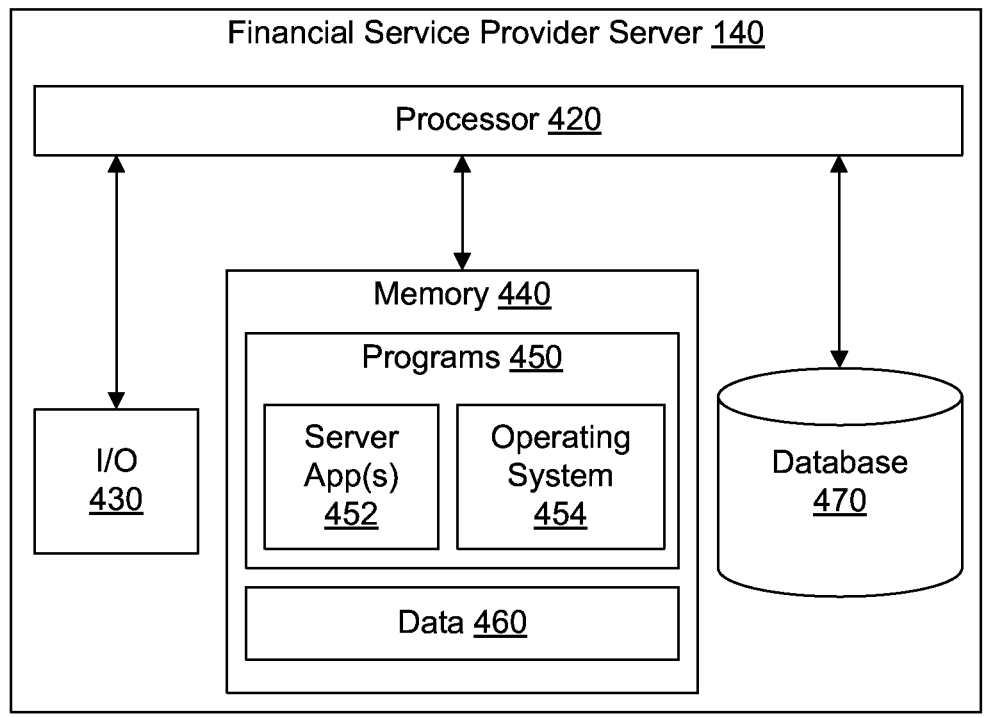
FIG. 4 is a diagram of an exemplary financial service provider server, consistent with disclosed embodiments.

FIG. 4 shows a diagram of an exemplary FSP server 140, consistent with disclosed embodiments. As show, FSP server 140 may include one or more processor 420, input/output ("I/O") devices 430, memory 440 storing programs 450 including, for example, server app(s) 452, operating system 454, and storing data 460, and a database 470. FSP server 140 may be a single server or may be configured as a distributed computer system including multiple servers or computers that interoperate to perform one or more of the processes and functionalities associated with the disclosed embodiments.

Processor 420 may be one or more known processing devices, such as a microprocessor from the Pentium™ family manufactured by Intel™ or the Turion™ family manufactured by AMD™. Processor 420 may constitute a single core or multiple core processors that executes parallel processes simultaneously. For example, processor 420 may be a single core processor configured with virtual processing technologies. In certain embodiments, processor 420 may use logical processors to simultaneously execute and control multiple processes. Processor 420 may implement virtual machine technologies, or other known technologies to provide the ability to execute, control, run, manipulate, store, etc. multiple software processes, applications, programs, etc. In another embodiment, processor 420 may include a multiple-core processor arrangement (e.g., dual, quad core, etc.) configured to provide parallel processing functionalities to allow FSP server 140 to execute multiple processes simultaneously. One of ordinary skill in the art would understand that other types of processor arrangements could be implemented that provide for the capabilities disclosed herein.

FSP server 140 may also include one or more I/O devices 430 that may comprise one or more interfaces for receiving signals or input from devices and providing signals or output to one or more devices that allow data to be received and/or transmitted by FSP server 140. For example, FSP server 140 may include interface components, which may provide interfaces to one or more input devices, such as one or more keyboards, mouse devices, and the like, that enable FSP server 140 to receive input from an employee of the financial service provider (not shown).

FSP server 140 may include one or more storage devices configured to store information used by processor 420 (or other components) to perform certain functions related to the disclosed embodiments. In one example, FSP server 140 may include memory 440 that includes instructions to enable processor 420 to execute one or more applications, such as server applications, an electronic transaction application, network communication processes, and any other type of application or software known to be available on computer systems. Alternatively or additionally, the instructions, application programs, etc. may be stored in an internal database 470 or external storage in direct communication with FSP server 140 (not shown), such as one or more database or memory accessible over network 150. Database 470 or other external storage may be a volatile or non-volatile, magnetic, semiconductor, tape, optical, removable, non-removable, or other type of storage device or tangible (i.e., non-transitory) computer-readable medium.

In one embodiment, FSP server 140 may include memory 440 that includes instructions that, when executed by processor 420, perform one or more processes consistent with the functionalities disclosed herein. Methods, systems, and articles of manufacture consistent with disclosed embodiments are not limited to separate programs or computers configured to perform dedicated tasks. For example, FSP server 140 may include memory 440 that may include one or more programs 450 to perform one or more functions of the disclosed embodiments. Moreover, processor 420 may execute one or more programs located remotely from account information display system 100. For example, FSP server 140 may access one or more remote programs, that, when executed, perform functions related to disclosed embodiments.

Programs 450 stored in memory 440 and executed by processor(s) 420 may include one or more server app(s) 452 and operating system 454. Server app(s) 452 may incorporate one or more financial services apps that cause processor(s) 420 to execute one or more processes related to financial services provided to customers including, but not limited to, processing credit and debit card transactions, checking transactions, fund deposits and withdrawals, transferring money between financial accounts, lending loans, processing payments for credit card and loan accounts, and retrieving and displaying account information.

Memory 440 and database 470 may include one or more memory devices that store data and instructions used to perform one or more features of the disclosed embodiments. Memory 440 and database 470 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

FSP server 140 may also be communicatively connected to one or more remote memory devices (e.g., remote databases (not shown)) through network 150 or a different network. The remote memory devices may be configured to store information and may be accessed and/or managed by FSP server 140. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Figure 5:
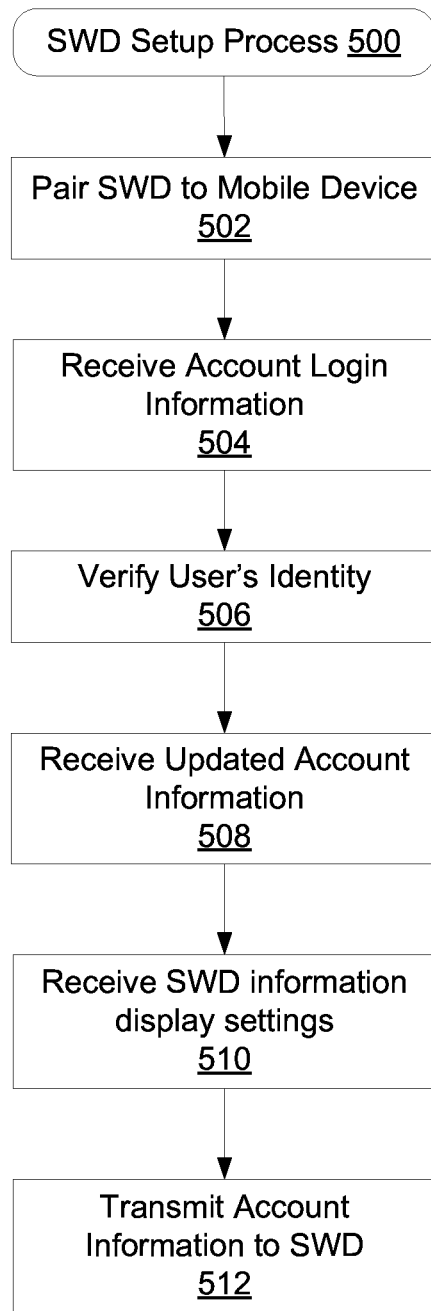
FIG. 5 is a flowchart of an exemplary method for setting up a smart wallet display, consistent with disclosed embodiments.

FIG. 5 shows a flowchart of an exemplary account information display process 500. Process 500 is described as performed primarily by mobile device 120. In some embodiments, however, mobile device 120, FSP server 140, and/or SWD 110 may perform one or more disclosed steps. Furthermore, process 500 is described as performed for user 130's account with FSP 140. In some embodiments, however, SWD 110 may receive and display account information for an account held with a third party financial service provider, such as a bank that operates third party server 160, using the methods discussed herein.

Disclosed embodiments provide an easy to use interface for displaying current account information without the need for cumbersome authentication and login steps. To ensure the correct account information is displayed and/or that the information display is secure, SWD 110 may be configured during the first use. SWD 110 may be configured by performing set up process 500. Setup process 500 may begin in step 502, by pairing SWD 110 to mobile device 120. Those of ordinary skill in the art will realize that certain aspects of pairing step 502 may be performed automatically by SWD 110 and/or mobile device 120, and that certain aspects may require manual interaction by user 130. For example, in some embodiments, user 130 may be required to place one or more of SWD 110 or mobile device 120 into a "pairing"

mode. In some embodiments, SWD 110 and/or mobile device 120 may initiate pairing mode automatically by wireless "handshake."

In step 504, FSP app 352 may receive account login information from user 130, such as an account name or account number, and authentication information such as a password, personal identification (PIN) number, date of birth, social security number, and/or billing information. In some embodiments, FSP app 352 may already have this information stored for user 130, and may re-request information for verifying user 130's identity, for the purpose of activating SWD 110.

In step 506, FSP app 352 may verify user 130's identity by sending the collected login and authentication information to FSP server 140, and receiving a response from FSP server 140. Upon receiving the login and authentication information, FSP server 140 may compare the information to one or more records stored in database 470 to determine whether user 130 is a current FSP customer and/or whether user 130's identify is verified. As discussed earlier, FSP app 352 may also send collected login and authentication information to a third party server 160 operated by another financial service provider, to verify user 130's identity and allow SWD 110 to receive account information from one or more accounts held by separate financial service providers.

In step 508, FSP app 352 may receive the most recent account information for one or more accounts associated with the verified user 130. Mobile device 120 may send one or more requests to FSP server 140 via network 150, and receive account information from FSP server 140.

In step 510, in some embodiments, FSP app 352 may receive settings for SWD 110 information display. In some embodiments, settings may be received from, for example, a settings file stored locally in mobile device 120 memory 340 or accessed remotely via network 150. In some embodiments, mobile device 120 may receive setting information via input from user 130 using I/O devices 320. Settings may include user 130's preferences such as, for example, which account information to display (if user 130 has multiple accounts), which information to display for each account, setting personal spending limits/goals, and/or one or more thresholds associated with, for example, a debt ceiling or debit account balance for the account(s).

In some embodiments, settings may also identify actions associated with certain conditions or thresholds. For example, user 130 may prefer to set actions associated with consequences for reaching or exceeding a personal spending limit, such as deactivating or turning off the card upon reaching a personal spending limit, or rolling over the extra expenditure into the next spending limit/goal time period. In some embodiments, user 130 may set preferences for types of expenses to include or exclude from personal spending limits/goals. For example, user 130 may select to exclude expenses from an upcoming vacation from the spending limits/goals. The number and type of settings (not shown in figures) may vary depending on the needs of user 130, the needs of the financial service provider, and/or the functions and capabilities of FSP server 140, mobile device 120, and SWD 110.

Finally, in step 512, FSP app 352 may transmit account information to SWD 110 for display. In some embodiments, FSP app 352 may analyze and format account information according to the settings configured in step 510. In such embodiments, the account information need not be formatted or analyzed on the SWD 110, but rather merely received and displayed, thereby minimizing the amount of processing and battery power required of SWD 110. In other embodiments, mobile device 120 may transmit settings to SWD 110, and thereafter transmit full account information for processing by SWD 110 processor 330 according to the settings. In other embodiments, both mobile device 120 and SWD 110 may process and format account information.

FIG. 6 shows a diagram of an exemplary smart wallet display update and display process 600, consistent with disclosed embodiments. In some embodiments, process 600 may include sending requests and receiving updates for one or more FSP 140 accounts identified in SWD setup process 500. In other embodiments, process 600 may also or alternatively include sending requests and receiving updates for one or more accounts held by one or more financial service providers other than FSP 140, such as one or more banks operating one or more third party servers 160.

Process 600 begins in step 602 when SWD 110 is activated. In some embodiments, SWD 110 processor 220 may activate SWD 110 automatically in response to data from one or more sensor 260 exceeding a predetermined threshold. For example, an ambient light sensor embedded in SWD 110 may detect a dramatic change in ambient light, indicative of user 130 opening their wallet and/or removing the SWD 110 from their pocket. Based on the change in ambient light, SWD 110 processor 220 may transition SWD 110's operating state from "sleep" to "wake," thereby activating the device. In some embodiments, SWD 110 may also include one or more I/O devices 230 for user 130 to manually activate SWD 110. For example, SWD 110 may include a button for turning SWD 110 on or off, and depressing the button may cause SWD 110 processor 220 to transition SWD 110's operating state from "sleep" to "wake," thereby activating the device.

In some embodiments, SWD 110 may include one or more security features for checking user 130's identity upon activation. For example, SWD 110 sensors 260 may include a biometric device, such as a fingerprint reader for capturing user 130's fingerprint. Processor 220 may compare the captured fingerprint against one or more stored fingerprints associated with the account owner, to verify user 130's identity as the account owner (steps not shown in figures). In some embodiments, SWD 110 activation (step 602) may occur upon processor 220 detecting activity in the biometric reader. For example, processor 220 detecting activity in the fingerprint reader when user 130 places a finger over the biometric sensor. The present embodiments may improve user 130's experience by verifying user 130's identity using SWD 110 and without the need for any user 130 interaction with mobile device 120, thereby simplifying the and expediting the process for retrieving and displaying account information, especially in fast-paced situations such as while paying for items in a store.

In step 604 processor 220 may determine whether a connection between SWD 110 and mobile device 120 is available. In some embodiments step 604 may involve determining whether a paired mobile device 120 is within communication range of SWD 110 transceiver 240 via short-range wireless transmission such as Bluetooth™ LE.

If a connection between SWD 110 and mobile device 120 is available ("Yes" in 604), then in step 606 SWD 110 may send a request to mobile device 120 for updated account information. In some embodiments, as an added layer of security, SWD 110 may also transmit a "token" such as an authentication key identifying SWD 110 to mobile device 120 (step not shown). Using the token, mobile device 120 may determine whether SWD 110 is the same SWD paired during process 500, thereby verifying both user 130's identity and that SWD 110 and mobile device 120 are the same components as previously paired during setup in process 500.

In step 608, mobile device 120 may receive the account information update request, triggering one or more functions of mobile device 120. For example, after receiving the request, in step 610 mobile device 120 processor 330 may determine whether a connection to FSP server 140 is available via antenna 370. If a connection is not available ("No" in step 610), then mobile device 120 may send the most recent account information stored in memory 340 to SWD 110 in step 612. In step 614, SWD 110 may receive the most recent account information, and proceed to process and store the received account information in step 616. SWD 110 processor 220 may process the account information according to settings received in process 500, and store the account information in memory 250. Thereafter, in step 618, SWD 110 may display the account information on display 210.

In some embodiments, information displayed in step 618 may include at least one of a credit card balance, a debit card balance, amount of credit remaining, progress toward a spending goal, amount exceeded past a spending goal, interest rate, savings account balance, checking account balance, rewards information such as a point balance or progress toward a rewards goal, or spending velocity. A spending goal may be a minimum or maximum amount of expenditures defined by user 130 during process 500 (or previously defined before process 500 or defined after process 500). Spending velocity may comprise an average rate of spending by user 130 during a predetermined time period, such as "$50 per day this billing month" or "$20 per day this year." FSP server 140, mobile device 120, and/or SWD 110 may calculate metrics about user 130's spending habits and spending history such as progress toward a goal or spending velocity, for display on SWD 110. In some embodiments, information displayed in step 618 may include a message to user 130. For example, SWD 110 may display a message informing user 130 as to how far they will exceed their personal goal or spending limit at the end of the billing cycle, at their current spending velocity.

As another example, SWD 110 may display one or more warning messages based on predetermined warning criteria. For example, user 130 may create one or more preferences during process 500 to flag stores which should be avoided (e.g. a store in which user 130 does not want to make payments from their account). Mobile device 120 may monitor its location and proximity to certain stores using built in GPS or location-determining circuitry (not shown in figures). If user 130 approaches or enters a store flagged during process 500, then mobile device 120 may instruct SWD 110 to display a message reminding user 130 to not make any payments with the account in that store.

In some embodiments, SWD 110 may also display user 130's credit score in step 618. For example, FSP server 140 may request user 130's credit score from one or more third party servers 160 operated by one or more credit reporting agencies. In other embodiments, FSP app 352 operating on mobile device 120 may request user 130's credit score from one or more third party servers 160 operated by one or more credit reporting agencies.

Returning to step 610, if a connection to FSP server 140 is available, such as via network 150 ("Yes" in step 610), then in step 620 mobile device 120 may send one or more requests for current account information to FSP server 140 via, for example, network 150. In step 622, FSP server 140 may receive the request, and send the current account information update in step 624. In step 626, mobile device 120 may receive the account information update, and may process the account information in step 628 according to one or more settings received in process 500, and send the processed account information update to SWD 110 in step 630. Upon receiving the account information update (step 614), SWD 110 may proceed to process and store the updated account information (step 616), and display the account information (step 618).

In some embodiments, SWD 110 processor 220 may check a timestamp associated with the received or recalled account information, in step 634. For example, processor 220 may compare the timestamp to a current time from an internal clock to determine the age of the account information. If the difference between the timestamp and the current time is greater than a predetermined amount, then in step 636 SWD 110 may provide an indication on display 210 that the account information is "old" (i.e. not current account information). For example, if the account information is at least one hour old, display 210 may include an icon to inform user 130 that the account information is older information. The predetermined amount of time necessary to trigger the "old" indication may be preconfigured, or may be set by user 130 during process 500.

Returning to step 604, if SWD 110 processor 220 determines that a connection to mobile device 120 is unavailable ("No" in step 604), then SWD 110 may recall the most recent stored account information in memory 250 in step 632. The recalled account information may be displayed (step 618) and simultaneously checked for the account information age by checking a timestamp (step 634). If processor 220 determines that the recalled account information is older than a predetermined threshold, then display 210 may include an indicator signaling that the account information is "old" (step 636).

Returning to step 618, while continuing to display account information, SWD 110 processor 220 may check to determine whether to change the contents of the displayed information in step 638. In some embodiments, processor 220 may automatically change display content frames at a predetermined time interval, to cycle through all account information. In some embodiments, user 130 may manually trigger a display change by pressing one or more buttons on SWD 110. If the determination to change display contents is positive ("Yes" in step 638), then SWD 110 may change display contents by selecting the next frame of information in step 640, and displaying the next frame of information (returning to step 618). In some embodiments, each account identified during setup process 500 may have at least one frame of information, and in some embodiments each frame of information may contain account information for multiple accounts.

If the determination to change display contents is negative ("No" in step 638), then processor 220 may detect whether to SWD 110 has been deactivated in step 642.

If processor 220 detects a deactivation event ("Yes" in step 642), then SWD 110 is deactivated in step 644. In some embodiments, SWD 110 may deactivate based on data from one or more sensor 260, such as an ambient light sensor detecting a dramatic decrease in ambient light. For example, when user 130 places SWD 110 back into their wallet or pocket, an ambient light sensor may detect a significant decrease in ambient light, signaling to processor 220 that user 130 is most likely no longer viewing SWD 110. As a result, processor 220 may place SWD 110 into a "sleep" mode, thereby deactivating SWD 110 to conserve battery power. In some embodiments, SWD 110 may deactivate in response to one or more I/O device 230 inputs, such as user 130 manually pressing an on/off button on SWD 110. In some embodiments, SWD 110 may deactivate automatically after a predetermined period of time. For example, processor 220 may be pre-programmed or configured during process 500 to deactivate automatically after displaying account information for a time period such as, for example, 30 seconds, or after an elapsed time period since the last user 130 input via I/O devices 230.

If processor 220 determines to not deactivate ("No" in step 642), then process 600 returns to step 618 to continue displaying account information, detecting display changes (step 638), and detecting deactivation (step 642).

In some embodiments, FSP server 140 may monitor user 130's account for new activity such as, for example, a new purchase, refund, or withdrawal transaction posts to user 130's account. When new transactions are posted to user 130's account, FSP server 140 may detect an account information update in step 646. In order to provide SWD 110 with the most current account information and provide user 130 with a clear picture of their current financial status, FSP server 140 may send a push update including the updated account information to mobile device 120 in step 648. In step 650, mobile device 120 may receive the push update from server FSP 140 via, for example, network 150. Mobile device 120 may process the push update in step 652 according to settings received in process 500. In step 654, mobile device 120 may send the processed push update to SWD 110 transceiver 240 via short range wireless transmission such as, for example, Bluetooth™ LE. In step 656, SWD 110 transceiver 240 may receive the push update.

In step 658, SWD 110 processor 220 may determine whether SWD 110 is currently activated when the push update is received. In some situations, SWD 110 may receive a push update while in a deactivated or "sleep" state, and in other situations SWD 110 may receive the push update while user 130 is viewing SWD 110 display 210 during a checkout process in a store. In situations where SWD 110 is "sleeping" and thus not activated when the push update is received ("No" in step 658), processor 220 may perform only minimal functions to conserve battery power, such as storing the push update account information in memory 250 in step 660, and ending process 600. If SWD 110 is activated later and cannot establish a connection to mobile device 120, the most recently received account information in the push update may be recalled for display (step 632).

If SWD 110 is already activated when the push update is received ("Yes" in step 658), then the account information may be processed and stored (step 616), and displayed (618). In some embodiments, if a push update causes SWD 110 to replace old account information being displayed in step 618 with current information, processor 220 may remove any "old" indicator displayed as a result of step 636 (removal step not shown in figure).

Those of ordinary skill in the art will appreciate that processes 500 and 600 may include greater or fewer steps depending on the needs of the financial service provider and user 130, and that some steps may occur in varying order from the flowcharts illustrated in FIGS. 5 and 6.

In some embodiments, SWD 110 may include one or more security features that utilize transceiver 240 (not shown in figures). For example, rather than recalling stored account information (step 632), SWD 110 may automatically lock and refuse to display account information when transceiver 240 is unable to connect to mobile device 120. Therefore, if user 130 forgets their phone or SWD 110 is lost and out of range (such as Bluetooth™ communication range) with mobile device 120, SWD 110 may refuse to display account information to prevent unauthorized individuals from viewing user 130's sensitive financial information. Furthermore, SWD 110 may erase some or all account information if a connection with mobile device 120 is lost or unavailable. User 130 may configure one or more settings regarding these features during process 500.

Another exemplary security feature may comprise a "find my wallet" feature. In some embodiments, SWD 110 may automatically wake from a sleep state and enter a "lost" mode if SWD 110 does not receive any push updates and/or cannot connect to mobile device 120 after a predetermined amount of time (e.g., 6 hours, 1 day, etc.). While in lost mode, SWD 110 transceiver 240 may periodically scan for any nearby device (such as another mobile device within Bluetooth™ range), and attempt to establish a connection with any nearby detected device, for example, a nearby detected device with its own FSP app 352 installed. Thus, while in lost mode, SWD 110 transceiver 240 may scan for any nearby device regardless of whether originally activated/paired with SWD 110. Once connected, SWD 110 may cause FSP app 352 of the nearby device to broadcast a location, such as GPS coordinates, to FSP server 140 and/or directly to user 130's mobile device 120. Mobile device 120 may display a message to user 130 informing them of the location for SWD 110 by display the location on mobile device 120 display 310. FSP app 352 of mobile device 120 may also allow user 130 to interact with the other mobile device located near SWD 110, such as by allowing user 130 to send a message to the nearby mobile device's owner asking them to retrieve and hold onto the wallet. Alternatively, FSP app 352 may allow user 130 to inform FSP server 140 that the wallet has been found and retrieved, and to end "lost" mode. In some embodiments, user 130 may enter "lost" mode manually by selecting one or more options in FSP app 352 on mobile device 120 to report a lost or stolen wallet. Mobile device 120 may then send a request to FSP server 140 to find the lost wallet, causing FSP server 140 to instruct other mobile devices having FSP app 352 installed to scan their areas for user 130's SWD 110.

Although display process 600 is described herein as including steps performed by SWD 110 and mobile device 120, some or all steps of process 600 may be performed by SWD 110, for example, in embodiments where SWD 110 comprises a transceiver 240 capable of communicating directly with FSP server 140, network 150, and/or third party server 160. Those of ordinary skill in the art will understand that in such embodiments, certain steps of process 600 may be omitted, such as information request and transmission steps related to transmissions between SWD 110 and mobile device 120.

Figure 7A:
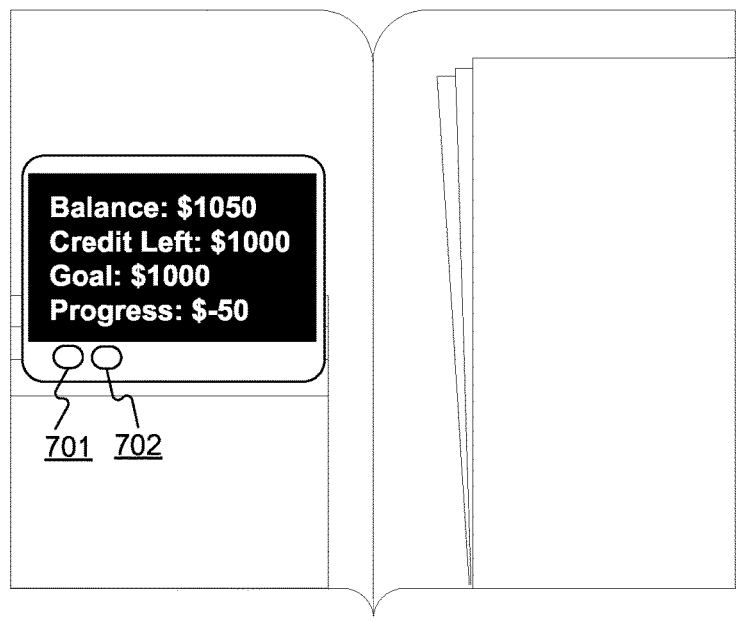
FIGS. 7A-7E are illustrations of exemplary smart wallet displays, consistent with disclosed embodiments.

FIGS. 7A-7E show exemplary embodiments of SWD 110. FIG. 7A shows an exemplary standalone SWD, which may be credit-card sized to with within a credit card slot in a wallet. This form factor may allow for a screen that occupies most of the device face, to display more account information in a single frame. The SWD may include one or more input buttons 701, 702 to allow user 130 to activate/deactivate the SWD and/or to toggle between account information frames.

Figure 7B:
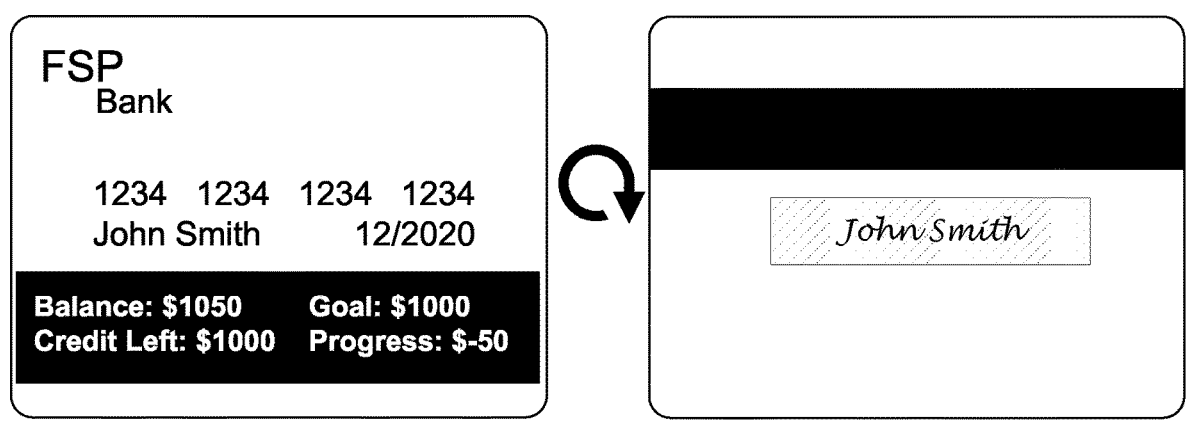

FIG. 7B shows an exemplary credit card SWD, comprising a credit card with the SWD device built into the credit card. This embodiment may require a majority of the SWD components to be located in the bottom portion of the credit card, so that the card is thin enough to pass through standard magnetic credit card readers. As shown, the display may occupy some or all of the bottom half of the credit card. One or more input buttons may be disposed on the credit card (not shown in figure).

Figure 7C:
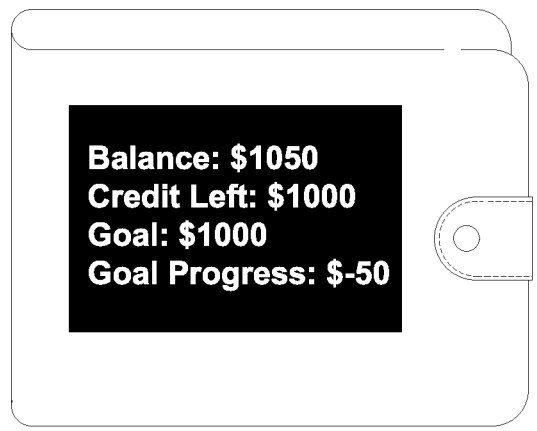

FIG. 7C shows an exemplary wallet SWD, comprising a SWD built into a wallet. In the illustration, the display is shown on the front face of the wallet. In some embodiments, the display may be placed on an interior face of the wallet. The larger form factor of the wallet may allow the display to be of a larger size, to display more information, and may allow the wallet to contain more input buttons (not shown), whether push buttons or touch-screen software-based buttons, and in some embodiments, a larger battery for longer operation between charges/battery replacement.

Figure 7D:
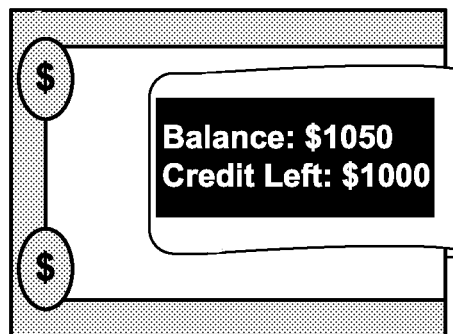

FIG. 7D shows an exemplary money clip SWD, comprising a SWD disposed within a clip for holding cash and/or payment cards. As shown in FIG. 7D, the display may have a smaller size than other embodiments, and the money clip may include one or more buttons (not shown), whether push buttons or touch-screen software-based buttons, to toggle between account information frames.

Figure 7E:

FIG. 7E shows an exemplary credit card SWD, having an LED indicator light bar in place of the display shown in the embodiment in FIG. 7B. The indicator light bar may comprise a plurality of lights, such as LED lights, arranged in a pattern or a row. In some embodiments the indicator lights may illuminate to indicate a status of the account. For example, the indicator lights may represent a status toward a personal spending goal or limit, or an account balance in relation to the account spending limit. In some embodiments, the indicator lights may change color as the illuminated bar grows or shrinks. In other embodiments, certain indicator lights may have fixed colors.

FIGS. 7A-7E are not meant to limit embodiments of the present disclosure in any way, and those of ordinary skill in the art will realize that SWD 110 may be built into other types of portable devices such as, for example, a wrist band, or a device for making near field communication (NFC) payments.

Those skilled in the relevant arts would recognize that the authentication methods and systems described herein could be used for purposes other than authorizing mobile payments. For example, the voice recognition authentication methods could be used in place of standard passwords for user account logins. As another example, voice recognition authentication may be used in place of security codes of PIN numbers for credit or debit card transactions performed over the Internet.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for displaying account information, comprising:
   a display device comprising:
   a processor;
   a display;
   a transceiver; and
   a memory having stored thereon instructions that, when executed by the processor, cause the processor to:
   pair with a device configured to access account information associated with a user;
   receive, using the transceiver, the account information from the device;
   check a timestamp associated with the account information;
   compare the timestamp with a current time to determine an age of the account information;
   cause the display to display the account information with an icon to inform the user of the age of the account information when the account information is older than a predetermined threshold preconfigured by the user;
   determine whether to change a content frame of the display displaying the account information; and
   change the content frame of the display displaying account information at a predetermined time interval to cycle through additional account information.

2. The system of claim 1, wherein the device is a cellular phone.

3. The system of claim 1, wherein the display device further comprises a fingerprint reader for authenticating the user.

4. The system of claim 3, wherein the processor causes the display to display account information based on an activation event.

5. The system of claim 4, wherein the activation event comprises at least one of:
   a detected fingerprint reader measurement received from the fingerprint reader, or
   detection of an increase in ambient light above a predetermined threshold,
   wherein the display device further comprises an ambient light sensor.

6. The system of claim 1, wherein the icon signals that the account information is old.

7. The system of claim 1, wherein the display device is credit card-sized.

8. The system of claim 1, wherein the transceiver is configured to receive the account information and send requests by establishing communication with a server.

9. The system of claim 1, further comprising:
determining that a connection with the device is unavailable.

10. A computer-implemented method for displaying account information, comprising:
pairing, by a processor of a display device, with a device;
receiving account information;
checking a timestamp associated with the account information;
comparing the timestamp with a current time to determine an age of the account information;
displaying the received account information with an icon to inform a user of the age of the account information when the account information is older than a predetermined threshold preconfigured by the user;
determining whether to change a content frame of the display displaying the account information; and
changing the content frame of the display displaying account information at a predetermined time interval to cycle through additional account information.

11. The computer-implemented method of claim 10, further comprising:
displaying the received account information based on an activation event.

12. The computer-implemented method of claim 11, wherein the activation event comprises a detected fingerprint reader measurement received from a fingerprint reader.

13. The computer-implemented method of claim 10, wherein detecting an activation event comprises detecting, by the processor, an increase in ambient light.

14. The computer-implemented method of claim 10, wherein the icon signals that the account information is old.

15. The computer-implemented method of claim 10, further comprising:
determining that a connection with the device is unavailable.

16. The computer-implemented method of claim 10, wherein a transceiver is configured to send requests and receive the account information by establishing communication with a server.

17. The computer-implemented method of claim 10, wherein the account information is received from the device.

18. A computer-implemented method for displaying account information, comprising:
pairing, by a processor of a display device, with a device configured to access account information associated with a user;
receiving account information from the device;
checking a timestamp associated with the account information;
comparing the timestamp with a current time to determine an age of the account information;
displaying the received account information with an icon to inform the user of the age of the account information when the account information is older than a predetermined threshold preconfigured by the user;
determining whether to change a content frame of the display displaying the account information; and
changing the content frame of the display displaying account information at a predetermined time interval to cycle through additional account information.

* * * * *